United States Patent
Tsujii

(10) Patent No.: US 11,394,838 B2
(45) Date of Patent: Jul. 19, 2022

(54) IMAGE FORMING APPARATUS ALLOWING VOICE OPERATION, CONTROL METHOD THEREFOR, STORAGE MEDIUM STORING CONTROL PROGRAM THEREFOR, AND IMAGE FORMING SYSTEM

(71) Applicant: CANON KABUSHIKI KAISHA, Tokyo (JP)

(72) Inventor: Hiroto Tsujii, Isehara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/522,773

(22) Filed: Jul. 26, 2019

(65) Prior Publication Data

US 2020/0053236 A1    Feb. 13, 2020

(30) Foreign Application Priority Data

Aug. 9, 2018   (JP) .............................. JP2018-150506

(51) Int. Cl.
*H04N 1/00*  (2006.01)

(52) U.S. Cl.
CPC ....... *H04N 1/00403* (2013.01); *H04N 1/0097* (2013.01); *H04N 1/00244* (2013.01); *H04N 1/00477* (2013.01); *H04N 1/00925* (2013.01); *H04N 2201/0094* (2013.01)

(58) Field of Classification Search
CPC .................................................. H04N 1/00403
USPC ........................................................ 358/1.13
See application file for complete search history.

(56) References Cited

U.S. PATENT DOCUMENTS

| 6,260,018 B1 * | 7/2001 | Imade .................... G10L 21/045 704/276 |
| 9,548,050 B2 | 1/2017 | Gruber et al. |
| 2018/0247065 A1 * | 8/2018 | Rhee ........................ G10L 15/22 |
| 2019/0260884 A1 * | 8/2019 | Nakajima ............... G06K 9/344 |
| 2019/0349488 A1 * | 11/2019 | Chitpasong ........ H04N 1/00403 |

FOREIGN PATENT DOCUMENTS

| JP | H07104962 A | 4/1995 |
| JP | 2014146940 A | 8/2014 |
| JP | 2014222513 A | 11/2014 |
| JP | 2016122980 A | 7/2016 |

* cited by examiner

*Primary Examiner* — Jacky X Zheng
(74) *Attorney, Agent, or Firm* — Rossi, Kimms & McDowell LLP

(57) ABSTRACT

An image forming apparatus that is capable of changing a setting content without putting an excessive burden on a user. An operation unit is operated by a user to change a setting content of the image forming apparatus. A memory device stores a set of instructions. At least one processor executes the set of instructions to obtain a command that is generated based on a natural language process for changing the setting content of the image forming apparatus, change the setting content of the image forming apparatus according to an operation to the operation unit and the command obtained, and prohibit the image forming apparatus from changing the setting content according to the operation to the operation unit in a case where the command based on the natural language process is obtained.

34 Claims, 8 Drawing Sheets

IMAGE FORMING APPARATUS ALLOWING VOICE OPERATION, CONTROL METHOD THEREFOR, STORAGE MEDIUM STORING CONTROL PROGRAM THEREFOR, AND IMAGE FORMING SYSTEM

BACKGROUND OF THE INVENTION

Field of the Invention

The present invention relates to an image forming apparatus allowing a voice operation, a control method therefor, a storage medium storing control program therefor, and an image forming system.

Description of the Related Art

An image forming apparatus like a multifunction apparatus changes a setting content according to a user's operation to an operation unit so as to form an image that a user intends. Since image quality enhancement and high functionalization of an image forming apparatus are improved in recent years, the number of setting items of an image forming apparatus increases in response, which complicates setting operations through an operation unit. As a result, when a user will use an image forming apparatus, the user has to change a setting content of every setting item after understanding functions and specifications of the image forming apparatus, which may increase a burden on the user.

In order to respond to such a present situation of an image forming apparatus, there is a technique that uses an interaction agent that allows an instruction and an operation by voice in a natural language for a setting operation to an image forming apparatus (Japanese Laid-Open Patent Publication (Kokai) No. 2014-222513 (JP 2014-222513A)). Thereby, a user is able to expect that setting contents of various setting items of the image forming apparatus are easily changed by voice in the natural language. However, if an interaction agent function is simply added to an existing image forming apparatus, a setting change process by a manual operation to an operation unit and a setting change process by the natural language become executable in synchronization.

In such an image forming apparatus, a setting content of the image forming apparatus may be changed against user's intention. That is, a setting content may be changed according to an operation to the operation unit while a user is going to change the setting content by the natural language using the interaction agent. In the meantime, if an input method is selected by a user in order to avoid such a situation, the number of the setting items increases on the contrary.

SUMMARY OF THE INVENTION

The present invention provides an image forming apparatus, a control method therefor, a storage medium storing a control program therefor, and an image forming system, which are capable of changing a setting content without putting an excessive burden on a user.

Accordingly, a first aspect of the present invention provides an image forming apparatus including an operation unit that is operated by a user to change a setting content of the image forming apparatus, a memory device that stores a set of instructions, and at least one processor that executes the set of instructions to obtain a command that is generated based on a natural language process for changing the setting content of the image forming apparatus, change the setting content of the image forming apparatus according to an operation to the operation unit and the command obtained, and prohibit the image forming apparatus from changing the setting content according to the operation to the operation unit in a case where the command based on the natural language process is obtained.

Accordingly, a second aspect of the present invention provides a control method for an image forming apparatus having an operation unit that is operated by a user for changing a setting content of the image forming apparatus, the control method including obtain a command that is generated based on a natural language process for changing the setting content of the image forming apparatus, change the setting content of the image forming apparatus according to an operation to the operation unit, change the setting content of the image forming apparatus according to the command obtained, and prohibit the image forming apparatus from changing the setting content according to the operation to the operation unit in a case where the command based on the natural language process is obtained.

Accordingly, a third aspect of the present invention provides a non-transitory computer-readable storage medium storing a control program causing a computer to execute the control method of the second aspect.

Accordingly, a fourth aspect of the present invention provides an image forming system including a voice input device that has a microphone that obtain voice in a natural language, and an image forming apparatus. The image forming apparatus includes an operation unit that is operated by a user to change a setting content of the image forming apparatus, a memory device that stores a set of instructions, and at least one processor that executes the set of instructions to obtain one of voice that is obtained by the microphone and a command obtained by applying a natural language process to the voice to change a setting content of the image forming apparatus, change the setting content of the image forming apparatus according to an operation to the operation unit and the command obtained, and prohibit the image forming apparatus from changing the setting content according to the user's operation to the operation unit in a case where the command based on the natural language process is obtained.

The image forming apparatus of the present invention allows a user to change a setting content without putting an excessive burden on a user.

Further features of the present invention will become apparent from the following description of exemplary embodiments with reference to the attached drawings.

DESCRIPTION OF THE EMBODIMENTS

Figure 1:
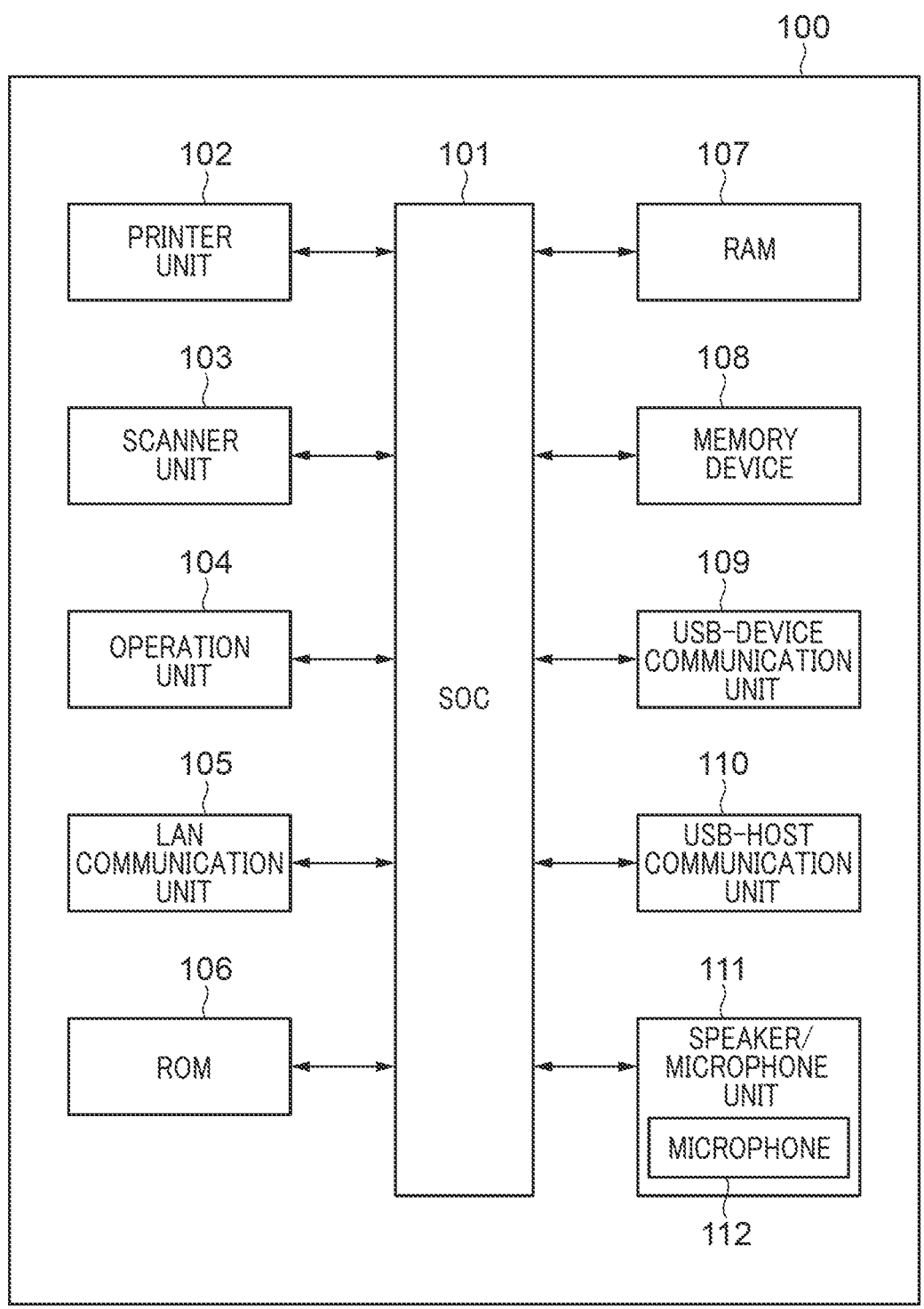
FIG. 1 is a block diagram schematically showing an internal configuration of an image forming apparatus according to a first embodiment of the present invention.

Hereafter, embodiments according to the present invention will be described in detail by referring to the drawings. Configurations described in the following embodiments are only examples, and the scope of the present invention is not limited by the configurations described in the embodiments.

FIG. 1 is a block diagram schematically showing an internal configuration of an image forming apparatus 100 according to a first embodiment of the present invention. The image forming apparatus 100 in FIG. 1 is a multifunction apparatus (MFP) equipped with a plurality of functions, such as copy and facsimile. The image forming apparatus 100 in FIG. 1 has a ROM 106, a RAM 107, a storage unit 108, a printer unit 102, a scanner unit 103, an operation unit 104, a LAN communication unit 105, a USB-device communication unit 109, a USB-host communication unit 110, and a speaker/microphone unit 111. These units of the image forming apparatus 100 are connected to an SOC 101.

The printer unit 102 has a photoconductive drum, laser generator, toner fixing device, and motor, for example. The printer 102 prints an image on a sheet. The scanner unit 103 has an original detection sensor, a reading sensor, and a motor, for example. The scanner unit 103 reads an image of a document. The operation unit 104 has a touch panel and keys, for example. The operation unit 104 displays a display data on the touch panel. The operation unit 104 outputs an operation signal corresponding to a user's operation in response to the user's operation.

The LAN communication unit 105 has a network controller and a wired LAN interface, for example. The LAN communication unit 105 is connected with an external device via a LAN cable that constitutes a network. The LAN communication unit 105 performs data communication with the external device. The USB-device communication unit 109 has a USB-device interface of the type B, for example. The USB-device communication unit 109 is connected with an external device, such as a personal computer, via a USB cable. The USB-device communication unit 109 performs data communication with a connected external device.

The USB-host communication unit 110 has a USB host interface of the type A and a power supply IC, for example. The USB-host communication unit 110 is connected with an external device, such as a personal computer, via a USB cable. The USB-host communication unit 110 supplies electric power to the connected external device, and performs data communication with the external device.

The speaker/microphone unit 111 has a microphone 112 that obtains user's voice in a natural language and a speaker that outputs a sound response to a user. The ROM 106 is a memory that stores a program for activating the SOC 101 and information about various setting items. The storage unit 108 is a nonvolatile memory that saves big-size programs and data. The storage unit 108 may consist of an HDD, an SSD, or a flash memory, for example. The RAM 107 is a work memory used for working the SOC 101.

The SOC 101 has a CPU, an interface for controlling the above-mentioned units, and a controller, for example. The CPU of the SOC 101 develops programs stored in the ROM 106 and storage unit 108 to the RAM 107 and runs them. Thereby, the SOC 101 functions as a main unit that controls the entire image forming apparatus 100. The CPU of the SOC 101 saves arithmetic processing results, image data used in a print process and a scan process, etc. into the RAM 107 or the storage unit 108 during a process based on a program. The CPU of the SOC 101 executes image forming processes, such as print and scan, according to a signal from the operation unit 104 etc.

Incidentally, the SOC 101 in the image forming apparatus 100, such as a multifunction apparatus, displays setting contents of the image forming apparatus 100 on the touch panel of the operation unit 104, and changes the setting contents of the image forming process according to user's operations to the operation unit 104, for example. Thereby, the image forming apparatus 100 forms an image that the user intends.

The image forming apparatus 100 uses an interaction agent that enables an instruction and operation by voice in the natural language for a setting operation to the image forming apparatus 100 using the speaker/microphone unit 111.

Figure 2:
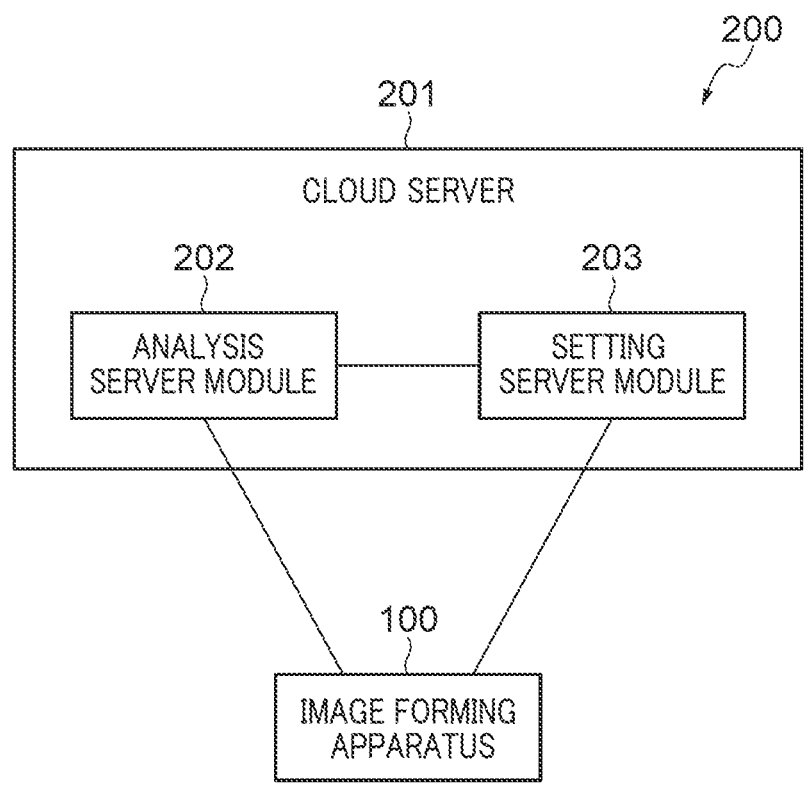
FIG. 2 is an explanatory view showing an image forming system including the image forming apparatus according to the first embodiment in FIG. 1.

FIG. 2 is an explanatory view showing an image forming system 200 according to the first embodiment including the image forming apparatus 100 in FIG. 1. The image forming system 200 in FIG. 2 has the image forming apparatus 100 in FIG. 1 and a cloud server 201. The cloud server 201 has a LAN communication unit, ROM, storage unit, RAM, and CPU as with the image forming apparatus 100 in FIG. 1. The CPU of the cloud server 201 develops programs stored in the ROM and storage unit, and runs them. Thereby, an analysis server module 202 and a setting server module 203 are achieved by the cloud server 201.

The analysis server module 202 analyzes voice data received by the LAN communication unit using a natural language process about voice, and outputs an analysis result to the setting server module 203. In the natural language process, the analysis server module 202 extracts phonemes included in voice waveform data and outputs a list of the phonemes as the analysis result, for example. The list of the phonemes corresponds to a list of terms. The setting server module 203 selects a setting operation to the image forming apparatus 100 using the analysis result obtained from the analysis server module 202.

The setting server module 203 compares the list of the phonemes of the analysis result with a list of phonemes associated with each of the setting operations beforehand, and selects a setting operation corresponding to the list of the phonemes that exhibits the highest matching degree. The setting server module 203 generates a command for giving the selected setting operation to the image forming apparatus 100, and makes the LAN communication unit send the command.

Figure 3:
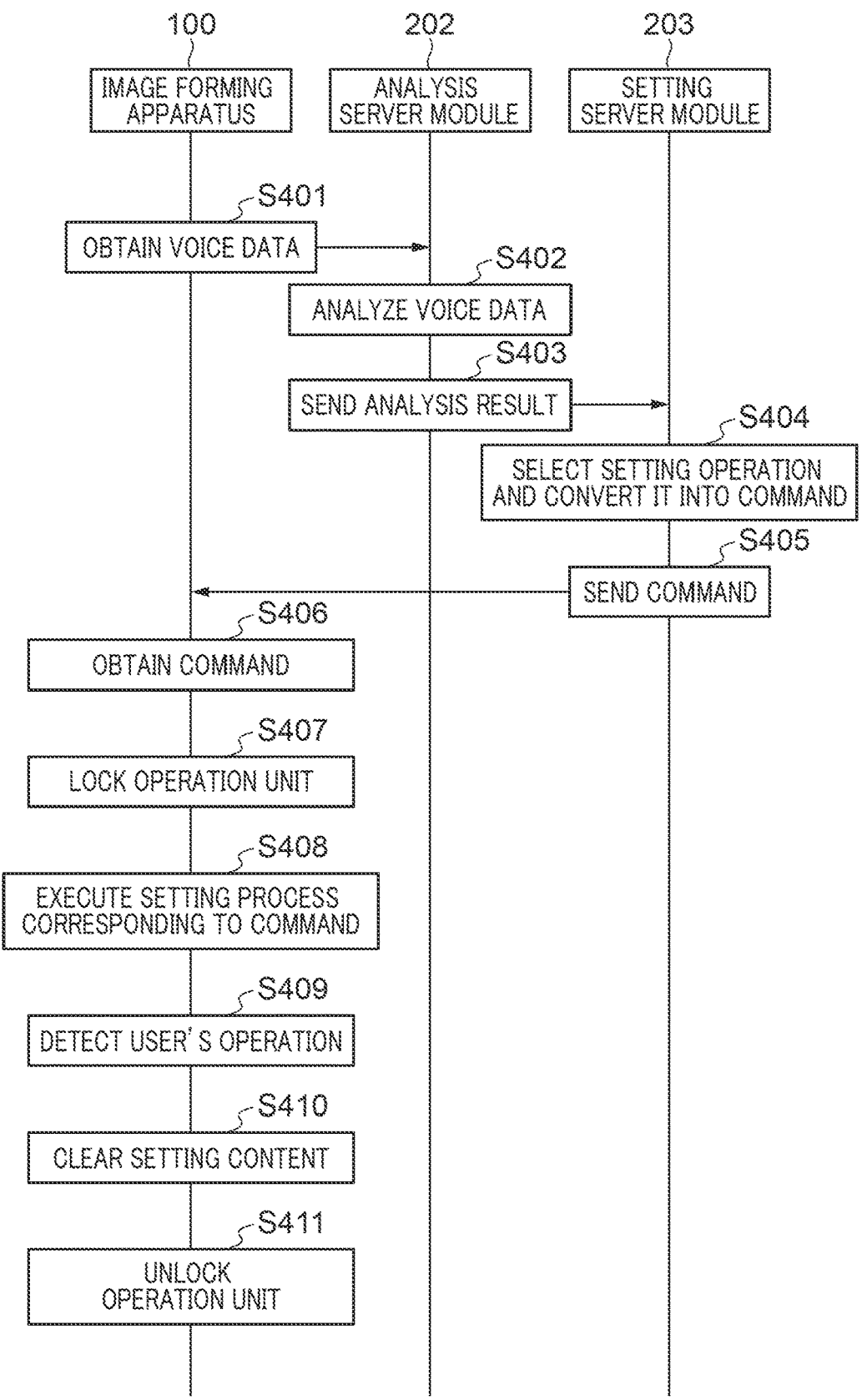
FIG. 3 is an explanatory view showing an example of a setting process sequence of the image forming system in FIG. 2.

FIG. 3 is an explanatory view showing an example of a setting process sequence of the image forming system 200 in FIG. 2. When obtaining voice data about a setting operation by user's voice from the microphone 112 in S401 in FIG. 3, the SOC 101 of the image forming apparatus 100 sends the voice data to the LAN communication unit of the cloud server 201 from the LAN communication unit 105. In S402, the analysis server module 202 of the cloud server 201 analyzes the voice data, which is received by the LAN communication unit, by the natural language process.

In S403, the analysis server module 202 outputs an analysis result to the setting server module 203. In S404, the setting server module 203 selects a setting operation to the image forming apparatus 100 using the analysis result obtained from the analysis server module 202 and converts the selected setting operation into a command. In S405, the setting server module 203 sends the command about the selected setting operation to the image forming apparatus 100 to the LAN communication unit 105 of the image forming apparatus 100 from the LAN communication unit of the cloud server 201.

In S406, the SOC 101 of the image forming apparatus 100 obtains the command about the setting operation selected by the cloud server 201 from the LAN communication unit 105. That is, the SOC 101 obtains the command about the setting operation obtained by applying the natural language process to the voice data that the microphone 112 of the image forming apparatus 100 obtained. After obtaining the command, the SOC 101 locks the operation unit 104 in S407 so as to prohibit change of a setting content (hereinafter referred to as "setting change") of the image forming apparatus 100 by a user's operation to the operation unit 104. Thereby, the SOC 101 detects a user's operation to the operation unit 104 but does not execute a process according to the operation. Moreover, the SOC 101 changes a setting content of the image forming apparatus 100 according to the obtained command.

That is, the SOC 101 executes a setting process corresponding to the obtained command in S408. In a case of the copy operation, setting contents include designation of the number of printing copies, and designation of printing image quality, for example. Thereby, the setting content of the image forming apparatus 100 is changed according to the setting operation by the user's voice. The changed setting content is recorded in the RAM 107 together with the other setting contents. In S409, the SOC 101 detects a user's operation to the operation unit 104. In S410, the SOC 101 clears the setting content changed according to the command so as to restore to a default content in response to the detection of the operation to the operation unit 104. In S411, the SOC 101 unlocks the operation unit 104 and enables the setting change based on an operation to the operation unit 104. After that, the SOC 101 changes the setting content of the image forming apparatus 100 according to the operation to the operation unit 104.

Figure 4A:
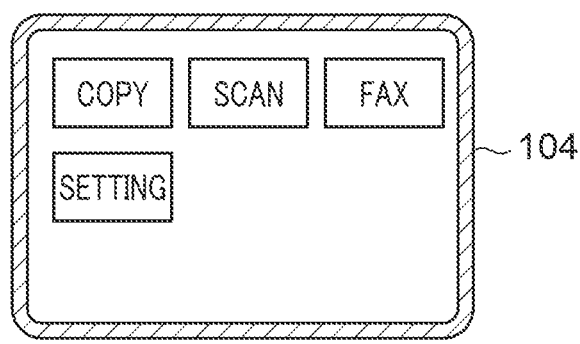
FIG. 4A through FIG. 4D are explanatory views showing examples of display screens displayed on a touch panel of an operation unit of the image forming apparatus in the setting process in FIG. 3.

FIG. 4A through FIG. 4D are explanatory views showing examples of display screens displayed on the touch panel of the operation unit 104 of the image forming apparatus 100 in the setting process in FIG. 3. FIG. 4A is a selection screen of functions of the image forming apparatus 100 displayed when a setting content is changed according to an operation to the operation unit 104. The SOC 101 displays the screen of FIG. 4A on the touch panel of the operation unit 104, when the image forming apparatus 100 is activated and when the operation unit 104 is unlocked in S411, for example.

Figure 4B:
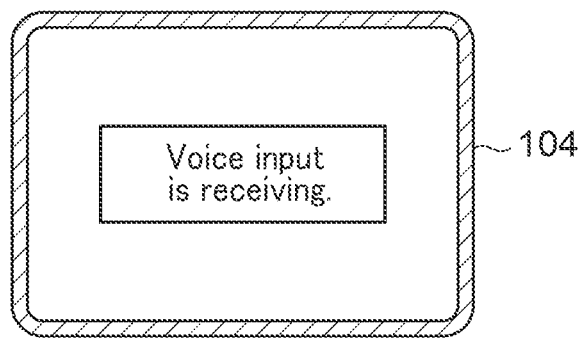
Figure 4C:
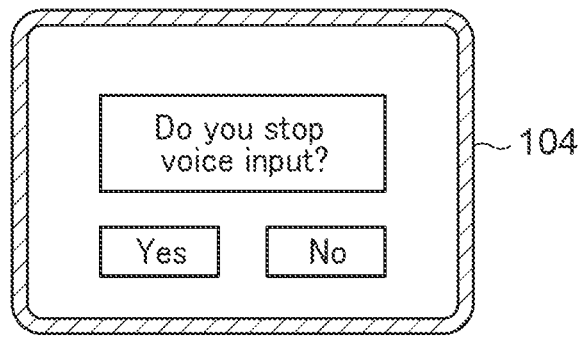
Figure 4D:
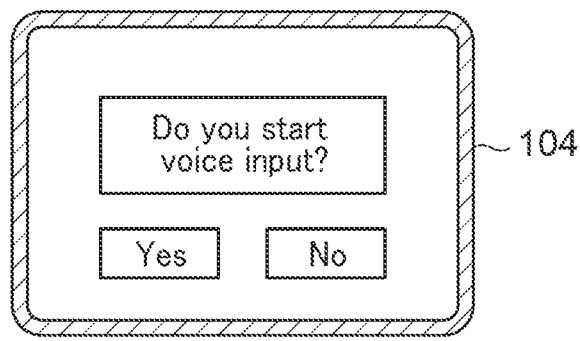

FIG. 4B is a screen showing that the operation unit 104 is locked and that voice input is acceptable. The SOC 101 displays the screen of FIG. 4B on the touch panel of the operation unit 104, when the voice input is accepted and the setting change by the operation to the operation unit 104 is prohibited in S407, for example. FIG. 4C is a screen showing that the voice input is stopped and that the operation unit 104 is unlocked. The SOC 101 displays the screen of FIG. 4C on the touch panel of the operation unit 104, when the setting content is cleared and the operation unit 104 is unlocked in S409, S410, or S411, for example. FIG. 4D is a screen showing that the operation unit 104 is unlocked and that the voice input starts. The SOC 101 displays the screen of FIG. 4D on the touch panel of the operation unit 104, when the command corresponding to the voice data is obtained in S406, for example.

Figure 5:
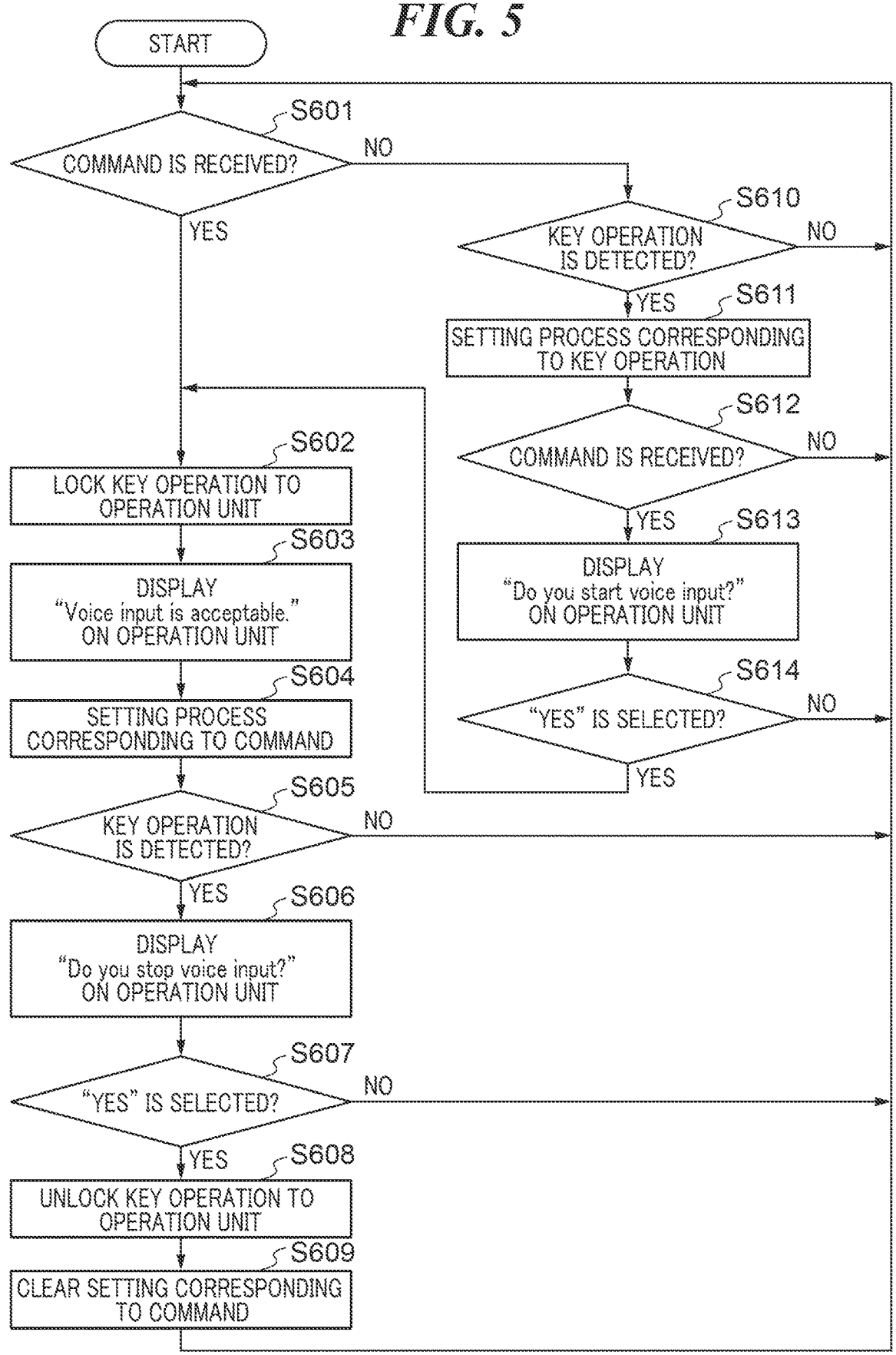
FIG. 5 is a flowchart showing an example of a process of the image forming apparatus corresponding to the setting process in FIG. 3.

FIG. 5 is a flowchart showing an example of a process of the image forming apparatus 100 corresponding to the setting process in FIG. 3. The CPU of the SOC 101 of the image forming apparatus 100 executes the process in FIG. 5, when changing a setting content of the image forming apparatus 100. In S601 in FIG. 5, the CPU of the SOC 101 determines whether a command is received from the setting server module 203. When no command is received, the CPU of the SOC 101 proceeds with the process to S610.

In S610, the CPU of the SOC 101 determines whether a user's operation to the operation unit 104 is detected. When a user's operation is not detected, the CPU of the SOC 101 returns the process to S601. Thus, the CPU of the SOC 101 waits for both of a command and a user's operation.

When determining that a command is received in S601, the CPU of the SOC 101 proceeds with the process to S602. In S602, the CPU of the SOC 101 locks the operation unit 104. In S603, the CPU of the SOC 101 displays the voice input accepting screen of FIG. 4B on the touch panel. The CPU of the SOC 101 executes the setting change according to the command in a setting process by the command in S604.

In S605, the CPU of the SOC 101 determines whether an operation to the operation unit 104 is detected. When no operation to the operation unit 104 is detected, the CPU of the SOC 101 returns the process to S601 and waits for the following command or operation. When an operation to the operation unit 104 is detected, the CPU of the SOC 101 displays the confirmation screen of FIG. 4C about stop of the voice input on the touch panel in S606. That is, the CPU of the SOC 101 displays a message for confirming whether the prohibition of the setting change of the image forming apparatus 100 by an operation to the operation unit 104 is released.

In S607, the CPU of the SOC 101 determines an operation to the confirmation screen about stop of the voice input on the operation unit 104. The CPU of the SOC 101 determines whether the setting change of the image forming apparatus 100 by the command based on the natural language process is continued when the operation unit 104 is operated in the state where the touch panel displays that the setting change by an operation to the operation unit 104 is prohibited. When the operation ("NO" in S607) that does not stop the voice input is given, the CPU of the SOC 101 returns the process to S601 and waits for the following command or operation. When the operation ("YES" in S607) that stops the voice input is given, the CPU of the SOC 101 unlocks the operation unit 104 in S608.

In S609, the CPU of the SOC 101 clears the setting content changed according to the command so as to restore to a default content. Thus, the CPU of the SOC 101 clears the setting content changed according to the command, when the setting change of the image forming apparatus 100 by the command based on the natural language process is not continued. After that, the CPU of the SOC 101 returns the process to S601 and waits for the following command or operation.

When determining that a user's operation is detected in S610, the CPU of the SOC 101 proceeds with the process to S611. In a setting process by the operation in S611, the CPU of the SOC 101 changes a setting content according to the user's operation to the operation unit 104.

In S612, the CPU of the SOC 101 determines whether a command is received from the setting server module 203. When no command is received, the CPU of the SOC 101 returns the process to S601 and waits for the following command or operation. When a command is received, the CPU of the SOC 101 displays the confirmation screen of FIG. 4D about start of the voice input on the touch panel. The CPU of the SOC 101 displays a message on the touch panel for confirming whether the setting change of the image forming apparatus 100 by the command based on the natural language process is started.

In S614, the CPU of the SOC 101 determines the operation to the confirmation screen about start of the voice input on the operation unit 104. When receiving a command based on the natural language process after changing the setting content of the image forming apparatus 100 according to the operation to the operation unit 104, the CPU of the SOC 101 determines whether the setting change of the image forming apparatus 100 by the command based on the natural language process is started. When the operation ("NO" in S614) that does not start the voice input is given, the CPU of the SOC 101 returns the process to S601 and waits for the following command or operation.

When the operation ("YES" in S614) that starts the voice input is given, the CPU of the SOC 101 proceeds with the process to S602. The CPU of the SOC 101 locks the operation unit 104 and executes the setting change according to the obtained voice input command. When starting the setting change of the image forming apparatus 100 by the command based on the natural language process, the CPU of the SOC 101 prohibits the setting change of the image forming apparatus 100 by the user's operation to the operation unit 104.

As mentioned above, the image forming apparatus 100 in this embodiment is able to change a setting content according to not only a user's operation to the operation unit 104 but also an obtained command generated by the natural language process. The user is able to change the setting contents of various kinds of setting items of the image forming apparatus 100 using voice in the natural language.

A user's burden is reduced in this embodiment. Moreover, in this embodiment, when a command based on the natural language process is obtained, the setting change of the image forming apparatus 100 by a user's operation to the operation unit 104 is prohibited in response to the obtainment. Accordingly, even if the operation unit 104 is operated while changing the setting content by the natural language, the setting content is not changed according to the operation to the operation unit 104. It becomes difficult to change the setting content of the image forming apparatus 100 against intention of the user who is going to change the setting content by the natural language.

Moreover, the CPU of the SOC 101 has prohibited the setting change of the image forming apparatus 100 by a user's operation to the operation unit 104 on the basis of obtainment of the command based on the natural language process. Accordingly, the user does not need to select or set an input method in addition to the setting operation by the natural language. Thus, in this embodiment, even if the operation unit 104 is operated while operating the image forming apparatus 100 by the natural language, the setting change by the screen operation is prohibited, which prevents the setting change that the user does not intend.

In this embodiment, the image forming apparatus 100 displays that the setting change by an operation to the operation unit 104 is prohibited on the touch panel of the operation unit 104, when the command based on the natural language process is obtained. This prevents the user from operating the operation unit 104 of the image forming apparatus 100, when the image forming apparatus 100 changes the setting content according to the command based on the natural language process.

Moreover, when the operation unit 104 is operated in the displaying state, the image forming apparatus 100 determines whether the setting change by the command based on the natural language process is continued. Then, when the setting change by the command is not continued, the image forming apparatus 100 clears the setting content that has been already changed according to the command.

At this time, the CPU of the SOC 101 displays a message on the touch panel for confirming whether the prohibition of the setting change of the image forming apparatus 100 by an operation to the operation unit 104 is released, for example, and may determine whether the setting change by the command is continued in accordance with the operation to the operation unit 104. Thereby, the user who is going to operate the operation unit 104 of the image forming apparatus 100 is able to change the setting content from a state that is not affected by the setting change by the previous commands.

The user is able to change a setting content from a state that does not include unintentional changes. When receiving a command based on the natural language process after changing the setting content of the image forming apparatus 100 according to the operation to the operation unit 104, the image forming apparatus 100 of this embodiment determines whether the setting change of the image forming apparatus 100 by the command based on the natural language process is started. Then, when starting the setting change by the command based on the natural language process, the image forming apparatus 100 prohibits the setting change of the image forming apparatus 100 by the user's operation to the operation unit 104. This disables the setting change of the image forming apparatus 100 by an operation to the operation unit 104 after the image forming apparatus 100 starts the setting change by the command based on the natural language process.

Moreover, the CPU of the SOC 101 displays a message on the touch panel of the operation unit for confirming whether the setting change of the image forming apparatus 100 by a command based on the natural language process is started, and determines whether the setting change by the command is started in accordance with the operation to the operation unit 104. Thereby, the image forming apparatus 100 is able to start the setting change by the command based on the natural language process according to the user's intention. In this embodiment, the speaker/microphone unit ill of the image forming apparatus 100 has the microphone 112 that obtains voice in the natural language, and the command is generated by applying the natural language process to the voice obtained by the microphone 112. Accordingly, the user is able to change a setting content using voice in the natural language in the state where the operation unit 104 of the image forming apparatus 100 is operatable.

Next, the image forming apparatus 100 and the image forming system 200 according to a second embodiment of the present invention will be described. This embodiment shows an example that inputs voice for changing a setting content to a mobile terminal 301. In the following description, differences from the first embodiment will be mainly described.

Figure 6:
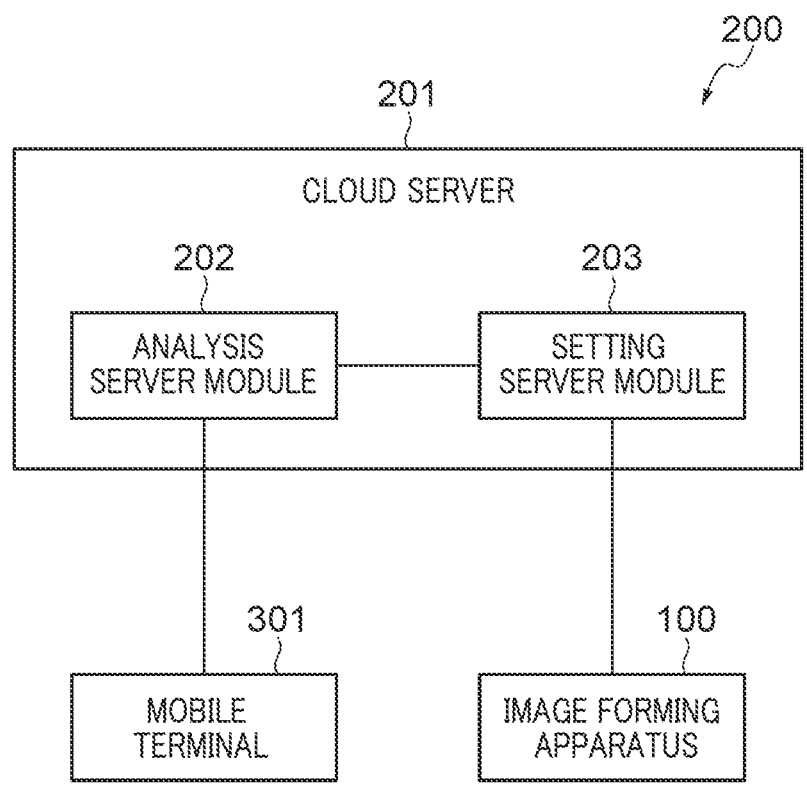
FIG. 6 is an explanatory view showing an image forming system according to a second embodiment.

FIG. 6 is an explanatory view showing the image forming system 200 according to the second embodiment. The image forming system 200 in FIG. 6 has the mobile terminal 301, the image forming apparatus 100 of which setting contents are changeable, and the cloud server 201. The mobile terminal 301 communicates with the analysis server module 202 of the cloud server 201 via an access point (not shown). The image forming apparatus 100 communicates with the setting server module 203 of the cloud server 201 through the LAN communication unit 105. In this case, the mobile terminal 301 receives a user's voice operation in the natural language and sends it as voice data to the analysis server module 202.

When receiving the voice data from the mobile terminal 301, the analysis server module 202 executes the natural language process and analyzes extracted terms. The setting server module 203 selects a setting operation to the image forming apparatus 100 using the analysis result obtained from the analysis server module 202. The setting server module 203 compares a list of phonemes of the analysis result with a list of phonemes associated with each of the setting operations beforehand, and selects a setting operation corresponding to the list of the phonemes that exhibits the highest matching degree. The setting server module 203 generates a command for giving the selected setting operation to the image forming apparatus 100, and makes the LAN communication unit send the command to the image forming apparatus 100.

Figure 7:
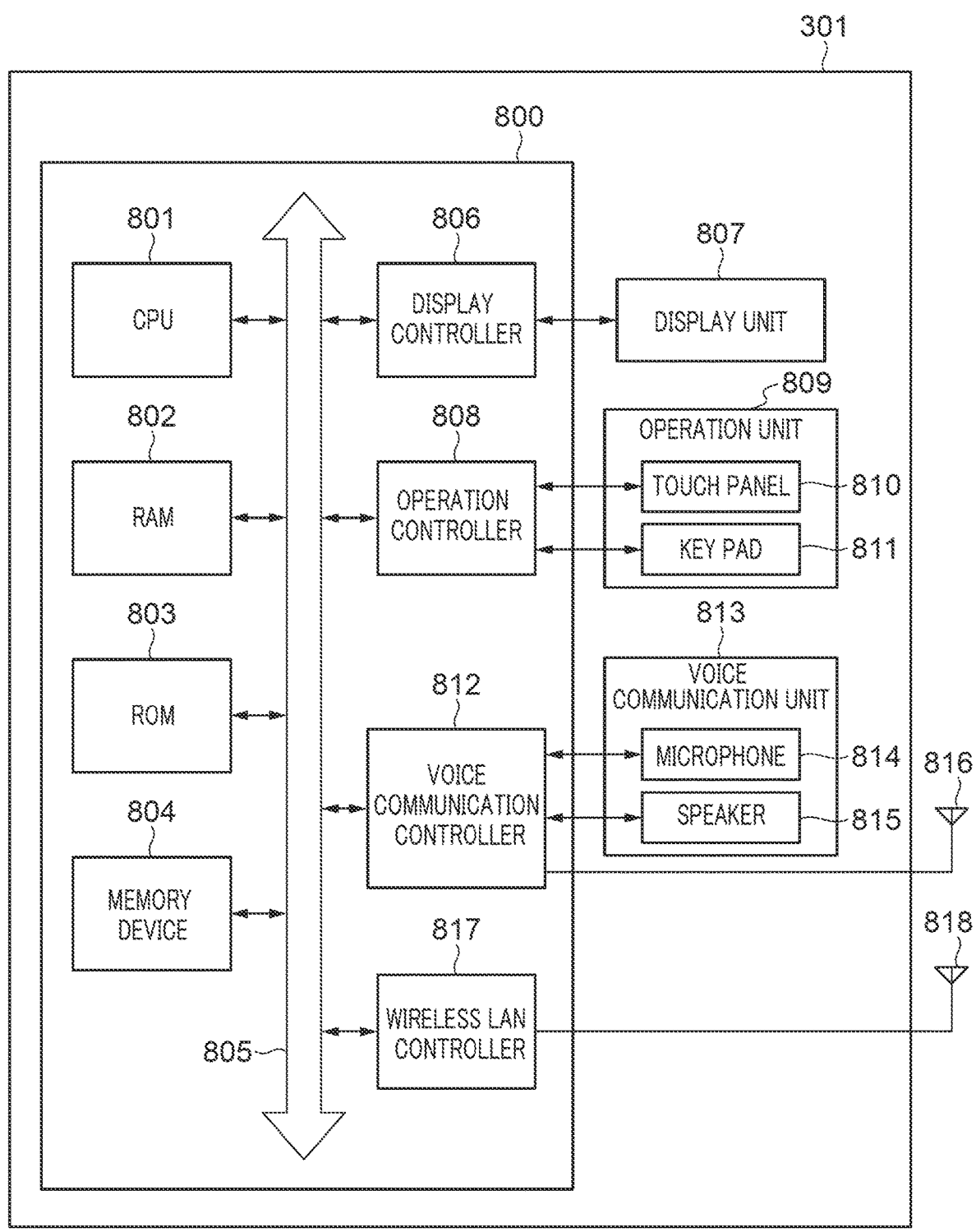
FIG. 7 is a block diagram schematically showing an internal configuration of a mobile terminal in FIG. 6.

FIG. 7 is a block diagram schematically showing an internal configuration of the mobile terminal 301 in FIG. 6. The mobile terminal 301 of FIG. 7 has a controller 800, a display unit 807, an operation unit 809, a telephone call unit 813, a voice antenna 816, and a wireless-LAN antenna 818. The controller 800 has a CPU 801, a RAM 802, a ROM 803, a storage unit 804, a display-unit controller 806, an operation-unit controller 808, a telephone-call-unit controller 812, a wireless-LAN controller 817, and a system bus 805.

The display-unit controller 806 sends image data etc. to the display unit 807 by a communication protocol of the display unit 807. The display unit 807 displays image data etc. The operation unit 809 has a touch panel 810 and a key pad 811. The operation-unit controller 808 receives an input from the touch panel 810 or the key pad 811, and converts it into digital data that is usable by the CPU 801. The telephone call unit 813 has a microphone 814 that obtains voice in the natural language and a speaker 815.

The telephone-call-unit controller 812 converts a voice signal input from the microphone 814 into voice data, codes, and superimposes the coded data on transmit radio wave of the voice antenna 816. The telephone-call-unit controller 812 outputs the voice data decoded from received radio wave of the voice antenna 816 to the speaker 815. The wireless-LAN controller 817 exchanges communication data with the cloud servers 201 via the above-mentioned access point through the wireless-LAN antenna 818.

The ROM 803 is a memory that stores a boot program for the CPU 801 and information about various setting items. The storage unit 804 is a nonvolatile memory that saves big-size programs and data. The storage unit 804 is a built-in flash memory or a semiconductor memory card connected to an external I/F, for example. The RAM 802 is a work memory used for working the CPU 801. The CPU 801 develops programs stored in the ROM 803 and storage unit 804 to the RAM 802 and runs them. Thereby, the CPU 801 functions as a main unit that controls the entire mobile terminal 301.

Figure 8:
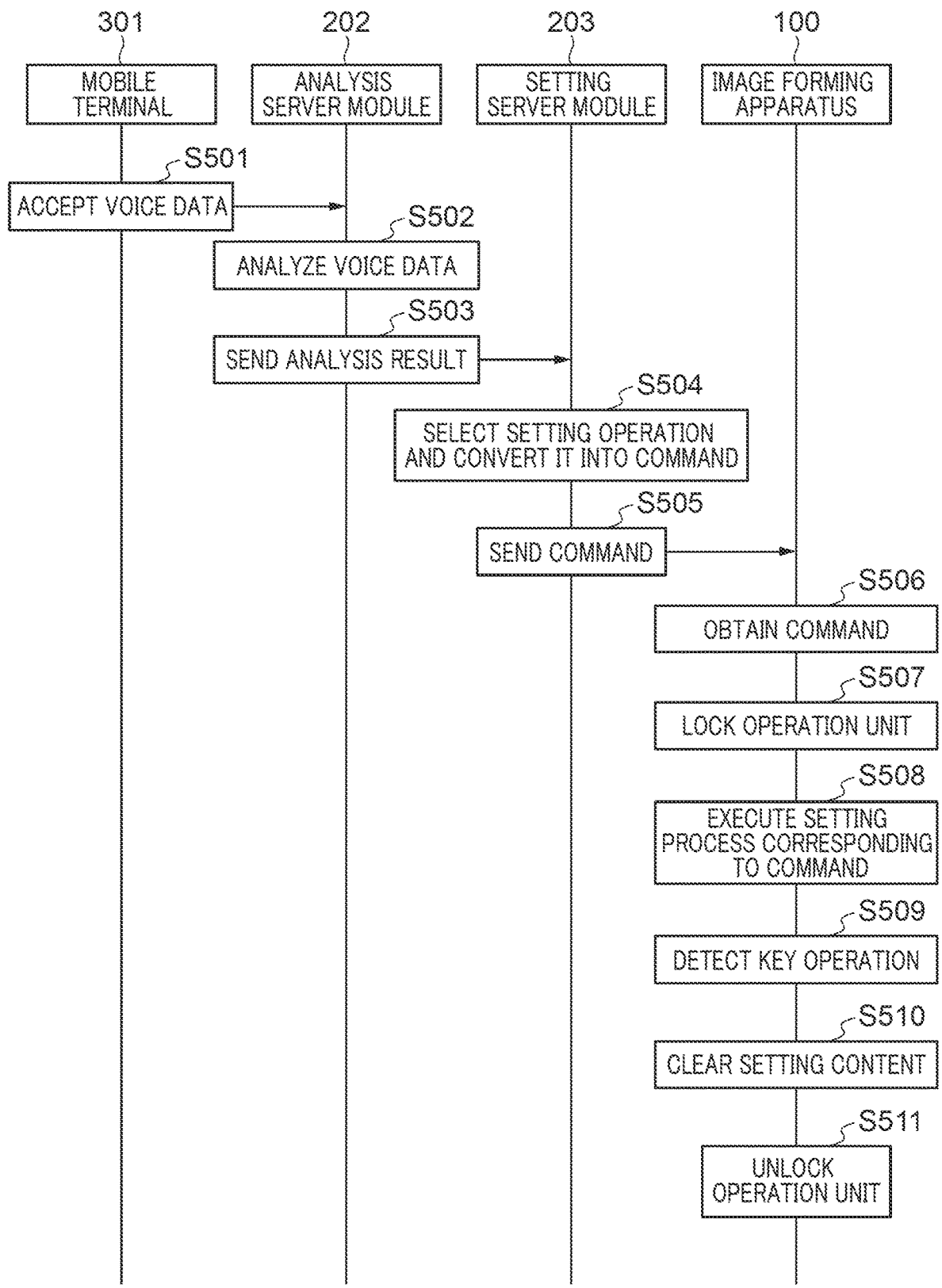
FIG. 8 is an explanatory view showing an example of a setting process sequence of the image forming system in FIG. 6.

FIG. 8 is an explanatory view showing an example of a setting process sequence of the image forming system 200 of FIG. 6. When obtaining voice data about a setting operation by user's voice from the microphone 814 in S501 in FIG. 8, the CPU 801 of the mobile terminal 301 sends the voice data to the LAN communication unit of the cloud server 201 from the LAN communication unit 817.

In S502, the analysis server module 202 of the cloud server 201 analyzes the voice data, which is received by the LAN communication unit, by the natural language process. In S503, the analysis server module 202 outputs an analysis result to the setting server module 203. In S504, the setting server module 203 selects a setting operation to the image forming apparatus 100 using the analysis result obtained from the analysis server module 202 and converts the selected setting operation into a command.

In S505, the setting server module 203 sends the command about the selected setting operation to the image forming apparatus 100 to the LAN communication unit 105 of the image forming apparatus 100 from the LAN communication unit of the cloud server 201. In S506, the SOC 101 of the image forming apparatus 100 obtains the command about the setting operation selected by the cloud server 201 from the LAN communication unit 105.

That is, the SOC 101 obtains the command about the setting operation obtained by applying the natural language process to the voice data that the microphone 814 of the mobile terminal 301 obtained. After obtaining the command, the SOC 101 locks the operation unit 104 of the image forming apparatus 100 in S507 so as to prohibit setting change of the image forming apparatus 100 by a user's operation to the operation unit 104. Thereby, the SOC 101 detects a user's operation to the operation unit 104 but does not execute a process according to the operation. Moreover, the SOC 101 changes a setting content of the image forming apparatus 100 according to the obtained command.

That is, the SOC 101 performs the setting operation corresponding to the obtained command in S508. In a case of the copy operation, the setting contents include designation of the number of printing copies, and designation of printing image quality, for example. Thereby, the setting content of the image forming apparatus 100 is changed according to the setting operation by the user's voice. The changed setting content is recorded in the RAM 107 together with the other setting contents.

In S509, the SOC 101 detects a user's operation to the operation unit 104 of the image forming apparatus 100. In S510, the SOC 101 clears the setting content changed according to the command so as to restore to a default content in response to the detection of the operation to the operation unit 104. In S511, the SOC 101 unlocks the operation unit 104 and enables the setting change based on an operation to the operation unit 104. After that, the SOC 101 changes the setting content of the image forming apparatus 100 according to the operation to the operation unit 104.

In this case, the flow of the process of the image forming apparatus 100 is the same as that in FIG. 5. Thus, in this embodiment, even if the operation unit 104 is operated while the user is operating the image forming apparatus 100 by the natural language, the setting change by the screen operation is prohibited, which prevents the setting change that the user does not intend.

As mentioned above, in this embodiment, the user speaks in the natural language to the microphone 814 of the mobile terminal 301 as a voice input device that is separated from the image forming apparatus 100. Thereby, the image forming apparatus 100 is able to change a setting content of the image forming apparatus 100 according to a command obtained by applying the natural language process to voice data. Accordingly, even if the user cannot operate the operation unit 104 of the image forming apparatus 100 because the user is apart from the image forming apparatus 100, for example, the user is able to change a setting content of the image forming apparatus 100 using the mobile terminal 301 and is able to use the image forming apparatus 100.

In this embodiment, the analysis server module 202 of the cloud server 201 obtains and analyzes the voice data that the microphone 814 of the mobile terminal 301 obtained, and the setting server module 203 obtains the analysis result and selects a setting operation to the image forming apparatus 100 using the analysis result. Accordingly, the image forming apparatus 100 itself does not need to implement the function to analyze voice data and the function to select a setting operation to the image forming apparatus 100 according to the analysis result. That is, the image forming apparatus does not need to implement the function corresponding to various natural languages.

Although the present invention has been described in detail on the basis of the suitable embodiments, the present invention is not limited to these specific embodiments and includes various configurations that do not deviate from the gist of this invention.

In the above-mentioned embodiments, the analysis server module 202 and the setting server module 203 are provided in the cloud server 201 that is separated from the image forming apparatus 100. However, at least one of the analysis server module 202 and the setting server module 203 may be mounted in the image forming apparatus 100.

Although the details are not described in the above-mentioned embodiments, the voice input may be used to change a setting content of one setting item of the image forming apparatus 100 or may be used to change setting contents of a plurality of setting items. In the case where the setting contents of the plurality of setting items are changed by the voice input, a plurality of commands may be generated for the respective setting items or a command that changes the setting contents of the setting items all at once may be generated.

In the setting processing of the above-mentioned embodiment shown in FIG. 5, the image forming apparatus 100 is able to obtain a setting operation by a command based on voice during a setting operation by an operation to the operation unit 104 of the image forming apparatus 100. That is, the image forming apparatus 100 gives priority to a setting operation by voice over a setting operation by a manual operation in FIG. 5.

In addition, the image forming apparatus 100 may prohibit one of a setting operation by a manual operation and a setting operation by voice after starting the other setting operation in the setting process of the image forming apparatus so as to treat both the setting operations equally. Moreover, the image forming apparatus 100 may give priority to a setting operation by a manual operation over a setting operation by voice in the setting process.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-150506, filed Aug. 9, 2018, which is hereby incorporated by reference herein in its entirety.

What is claimed is:

1. An image forming system that is capable of performing a first process corresponding to a command obtained by performing at least a natural language process on a voice command, the image forming system comprising:

a microphone that is capable of receiving a voice command;

an operation device configured to receive a nonverbal user operation that instructs execution of the first process, the operation device including a display device configured to display user information; and one or more controllers configured to function as:

a unit configured to cause the display device to display a screen arranged with a plurality of function icons selectable via the operation device, wherein the plurality of function icons include an icon related to an image forming function;

a unit configured to determine whether the command obtained by performing the natural language process on the voice command received via the microphone has been received;

a unit configured to, in a first case where it is determined that the command obtained by performing the natural language process on the voice command received via the microphone has been received, (i) cause the display device to display a notification, after the command obtained by performing the natural language process on the voice command received via the microphone is received, indicating that the first process corresponding to the command obtained by performing the natural language process on the voice command received via the microphone is being performed and to (ii) detect the nonverbal user operation, received by the operation device, instructing execution of the first process and prevent execution of the first process instructed by the detected nonverbal user operation while the notification is being displayed; and a unit configured to, in a second case where it is determined that the command obtained by performing the natural language process on the voice command received via the microphone has not been received, detect the nonverbal user operation, received by the operation device, instructing execution of the first process and execute the first process instructed by the detected nonverbal user operation.

2. The image forming system according to claim 1, wherein the one or more controllers are configured to cause the display device to display another notification according to a detection of an operation on the operation device in a state that the notification is being displayed on the display device, the another notification prompting a cancellation or a continuation of a state where input of the voice command is acceptable.

3. The image forming system according to claim 2, wherein the another notification includes a button for the cancellation of the state where input of the voice command is acceptable.

4. The image forming system according to claim 3, wherein a plurality of commands, obtained by respectively performing the natural language process on a plurality of voice commands received via the microphone, are obtained before the cancellation of the state where input of the voice command is acceptable is instructed via the button included in the another notification.

5. The image forming system according to claim 2, wherein the another notification includes a button for the continuation of the state where input of the voice command is acceptable.

6. The image forming system according to claim 2, wherein the notification includes a message indicating that the image forming system is in the state where input of the voice command is acceptable.

7. The image forming system according to claim 2, wherein:
a communication apparatus includes the microphone; and
an image forming apparatus includes the one or more controllers.

8. The image forming system according to claim 7, wherein the communication apparatus is a mobile terminal.

9. The image forming system according to claim 1, further comprising:
a server that obtains voice data, as the voice command, obtained by the microphone, analyzes the obtained voice data by the natural language process, and obtains the command according to an analysis result of the obtained voice data,
wherein the one or more controllers obtain the command obtained by the server.

10. The image forming system according to claim 1, further comprising:
a first server that obtains voice data, as the voice command, obtained by the microphone and that analyzes the obtained voice data; and
a second server that obtains the command according to an analysis result of the obtained voice data,
wherein the one or more controllers obtain the command obtained by the second server.

11. The image forming system according to claim 1, wherein the plurality of function icons includes an icon related to a copy function.

12. The image forming system according to claim 1, wherein the plurality of function icons includes an icon related to a scan function.

13. The image forming system according to claim 1, wherein the plurality of function icons includes an icon related to a fax function.

14. The image forming system according to claim 1, wherein the plurality of function icons includes an icon related to a setting function.

15. The image forming system according to claim 1, wherein an image forming apparatus includes the microphone, the operation device, and the one or more controllers.

16. An image forming apparatus that is capable of performing a first process corresponding to a command obtained by performing at least a natural language process on a voice command, the image forming apparatus comprising:
a microphone that is capable of receiving a voice command;
an operation device configured to receive a nonverbal user operation that instructs execution of the first process, the operation device including a display device configured to display user information; and
one or more controllers configured to function as:
a unit configured to cause the display device to display a screen arranged with a plurality of function icons selectable via the operation device, wherein the plurality of function icons include an icon related to an image forming function;
a unit configured to determine whether the command obtained by performing the natural language process on the voice command received via the microphone has been received;
a unit configured to, in a first case where it is determined that the command obtained by performing the natural language process on the voice command received via the microphone has been received, (i) cause the display device to display a notification, after the command obtained by performing the natural language process on the voice command received via the microphone is received, indicating that the first process corresponding to the command obtained by performing the natural language process on the voice command received via the microphone is being performed and to (ii) detect the nonverbal user operation, received by the operation device, instructing execution of the first process and prevent execution of the first process instructed by the detected nonverbal user operation while the notification is being displayed; and
a unit configured to, in a second case where it is determined that the command obtained by performing the natural language process on the voice command received via the microphone has not been received, detect the nonverbal user operation, received by the operation device, instructing execution of the first process and execute the first process instructed by the detected nonverbal user operation.

17. A method for controlling an image forming apparatus that is capable of performing a first process corresponding to a command obtained by performing at least a natural language process on a voice command and that has a microphone that is capable of receiving a voice command and an operation device configured to receive a nonverbal user operation that instructs execution of the first process, the operation device including a display device configured to display user information, the method comprising:
causing the display device to display a screen arranged with a plurality of function icons selectable via the operation device, wherein the plurality of function icons include an icon related to an image forming function;

determining whether the command obtained by performing the natural language process on the voice command received via the microphone has been received;

in a first case where it is determined that the command obtained by performing the natural language process on the voice command received via the microphone has been received, (i) causing the display device to display a notification, after the command obtained by performing the natural language process on the voice command received via the microphone is received, indicating that the first process corresponding to the command obtained by performing the natural language process on the voice command received via the microphone is being performed and (ii) detecting the nonverbal user operation, received by the operation device, instructing execution of the first process and preventing execution of the first process instructed by the detected nonverbal user operation while the notification is being displayed; and in a second case where it is determined that the command obtained by performing the natural language process on the voice command received via the microphone has not been received, detecting the nonverbal user operation, received by the operation device, instructing execution of the first process and executing the first process instructed by the detected nonverbal user.

18. An image forming system that is capable of performing a first process corresponding to a command obtained by performing at least a natural language process on a voice command, the image forming system comprising:
   a microphone that is capable of receiving a voice command;
   an operation device configured to receive a nonverbal user operation that instructs execution of the first process, the operation device including a key pad and a touch panel display device, the touch panel display device being configured to display user information; and
   one or more controllers configured to function as:
   a unit configured to cause the touch panel display device to display an operation screen;
   a unit configured to determine whether the command obtained by performing the natural language process on the voice command received via the microphone has been received;
   a unit configured to, in a first case where it is determined that the command obtained by performing the natural language process on the voice command received via the microphone has been received, (i) cause the touch panel display device to display a notification, after the command obtained by performing the natural language process on the voice command received via the microphone is received, indicating that the first process corresponding to the command obtained by performing the natural language process on the voice command received via the microphone is being performed and to (ii) detect the nonverbal user operation, received by the key pad of the operation device, instructing execution of the first process and prevent execution of the first process instructed by the nonverbal user operation received by the key pad while the notification is being displayed; and
   a unit configured to, in a second case where it is determined that the command obtained by performing the natural language process on the voice command received via the microphone has not been received, detect the nonverbal user operation, received by the key pad of the operation device, instructing execution of the first process and execute the first process instructed by the nonverbal user operation received by the key pad.

19. The image forming system according to claim 18, wherein the one or more controllers are configured to cause the touch panel display device to display another notification according to a detection of an operation on the operation device in a state that the notification is being displayed on the touch panel display device, the another notification prompting a cancellation or a continuation of a state where input of the voice command is acceptable.

20. The image forming system according to claim 19, wherein the another notification includes a button for the cancellation of the state where input of the voice command is acceptable.

21. The image forming system according to claim 20, wherein a plurality of commands, obtained by respectively performing the natural language process on a plurality of voice commands received via the microphone, are obtained before the cancellation of the state where input of the voice command is acceptable is instructed via the button included in the another notification.

22. The image forming system according to claim 19, wherein the another notification includes a button for the continuation of the state where input of the voice command is acceptable.

23. The image forming system according to claim 19, wherein the notification includes a message indicating that the image forming system is in the state where input of the voice command is acceptable.

24. The image forming system according to claim 19, wherein:
   a communication apparatus includes the microphone; and
   an image forming apparatus includes the one or more controllers.

25. The image forming system according to claim 24, wherein the communication apparatus is a mobile terminal.

26. The image forming system according to claim 18, further comprising:
   a server that obtains voice data, as the voice command, obtained by the microphone, analyzes the obtained voice data by the natural language process, and obtains the command according to an analysis result of the obtained voice data,
   wherein the one or more controllers obtain the command obtained by the server.

27. The image forming system according to claim 18, further comprising:
   a first server that obtains voice data, as the voice command, obtained by the microphone and that analyzes the obtained voice data; and
   a second server that obtains the command according to an analysis result of the obtained voice data,
   wherein the one or more controllers obtain the command obtained by the second server.

28. The image forming system according to claim 18, wherein the displayed operation screen includes a plurality of function icons including an icon related to a copy function.

29. The image forming system according to claim 18, wherein the displayed operation screen includes a plurality of function icons including an icon related to a scan function.

30. The image forming system according to claim 18, wherein the displayed operation screen includes a plurality of function icons including an icon related to a fax function.

31. The image forming system according to claim 18, wherein the displayed operation screen includes a plurality of function icons including an icon related to a setting function.

32. The image forming system according to claim 18, wherein an image forming apparatus includes the microphone, the operation device, and the one or more controllers.

33. An image forming apparatus that is capable of performing a first process corresponding to a command obtained by performing at least a natural language process on a voice command, the image forming apparatus comprising:
- a microphone that is capable of receiving a voice command;
- an operation device configured to receive a nonverbal user operation that instructs execution of the first process, the operation device including a key pad and a touch panel display device, the touch panel display device being configured to display user information; and
- one or more controllers configured to function as:
  - a unit configured to cause the touch panel display device to display an operation screen;
  - a unit configured to determine whether the command obtained by performing the natural language process on the voice command received via the microphone has been received;
  - a unit configured to, in a first case where it is determined that the command obtained by performing the natural language process on the voice command received via the microphone has been received, (i) cause the touch panel display device to display a notification, after the command obtained by performing the natural language process on the voice command received via the microphone is received, indicating that the first process corresponding to the command obtained by performing the natural language process on the voice command received via the microphone is being performed and to (ii) detect the nonverbal user operation, received by the key pad of the operation device, instructing execution of the first process and prevent execution of the first process instructed by the nonverbal user operation received by the key pad while the notification is being displayed; and
  - a unit configured to, in a second case where it is determined that the command obtained by performing the natural language process on the voice command received via the microphone has not been received, detect the nonverbal user operation, received by the key pad of the operation device, instructing execution of the first process and execute the first process instructed by the nonverbal user operation received by the key pad.

34. A method for controlling an image forming apparatus that is capable of performing a first process corresponding to a command obtained by performing at least a natural language process on a voice command and that has a microphone that is capable of receiving a voice command and an operation device configured to receive a nonverbal user operation that instructs execution of the first process, the operation device including a key pad and a touch panel display device, the touch panel display device being configured to display user information, the method comprising:
- causing the touch panel display device to display an operation screen;
- determining whether the command obtained by performing the natural language process on the voice command received via the microphone has been received;
- in a first case where it is determined that the command obtained by performing the natural language process on the voice command received via the microphone has been received, (i) causing the touch panel display device to display a notification, after the command obtained by performing the natural language process on the voice command received via the microphone is received, indicating that the first process corresponding to the command obtained by performing the natural language process on the voice command received via the microphone is being performed and (ii) detecting the nonverbal user operation, received by the key pad of the operation device, instructing execution of the first process and preventing execution of the first process instructed by the detected nonverbal user operation, received by the key pad, while the notification is being displayed; and
- in a second case where it is determined that the command obtained by performing the natural language process on the voice command received via the microphone has not been received, detecting the nonverbal user operation, received by the key pad of the operation device, instructing execution of the first process and executing the first process instructed by the detected nonverbal user operation received by the key pad.

* * * * *